United States Patent
Nielsen

(10) Patent No.: US 7,776,374 B2
(45) Date of Patent: Aug. 17, 2010

(54) METHOD AND MEANS OF THAWING MEAT AND USE THEREOF

(75) Inventor: Bjarne Nielsen, Svenstrup J. (DK)

(73) Assignee: SFK Systems A/S, Kolding (DK)

( * ) Notice: Subject to any disclaimer, the term of this patent is extended or adjusted under 35 U.S.C. 154(b) by 1342 days.

(21) Appl. No.: 10/491,049

(22) PCT Filed: Oct. 8, 2002

(86) PCT No.: PCT/DK02/00673

§ 371 (c)(1),
(2), (4) Date: Sep. 8, 2005

(87) PCT Pub. No.: WO03/032740

PCT Pub. Date: Apr. 24, 2003

(65) Prior Publication Data

US 2006/0034991 A1    Feb. 16, 2006

(30) Foreign Application Priority Data

Oct. 18, 2001   (DK) ............................... 2001 01531

(51) Int. Cl.
*A23L 3/365* (2006.01)
(52) U.S. Cl. ...................... 426/281; 426/641; 426/518; 426/519; 426/524
(58) Field of Classification Search ................ 426/251, 426/506, 524, 281, 641–647, 518, 519; 99/472, 99/516, 535
See application file for complete search history.

(56) References Cited

U.S. PATENT DOCUMENTS

| 3,384,002 A | * | 5/1968 | Bonuchi et al. ............... 99/483 |
| 3,402,053 A | | 9/1968 | Longe et al. |
| 3,498,208 A | * | 3/1970 | Longe et al. .................. 99/483 |
| 3,537,864 A | * | 11/1970 | Magiera ...................... 426/641 |
| 3,857,254 A | * | 12/1974 | Lobel .......................... 62/373 |
| 3,928,634 A | * | 12/1975 | Gasbarro .................... 426/281 |
| 4,012,808 A | * | 3/1977 | Strong ......................... 426/442 |
| 4,517,888 A | * | 5/1985 | Gould .......................... 99/472 |
| 4,657,771 A | | 4/1987 | Gould |
| 4,994,294 A | * | 2/1991 | Gould .......................... 426/519 |
| 5,220,812 A | * | 6/1993 | Palbiski et al. ................ 62/381 |
| 5,947,015 A | * | 9/1999 | Laurbak ...................... 99/535 |

(Continued)

FOREIGN PATENT DOCUMENTS

EP   0 127 608   5/1984

(Continued)

*Primary Examiner*—Drew E Becker
(74) *Attorney, Agent, or Firm*—William J. Sapone; Coleman Sudol Sapone P.C.

(57) ABSTRACT

The invention relates to a method of thawing one or more frozen blocks of meat, said blocks of meat being composed of units of meat frozen together. This object is achieved in that the frozen blocks of meat are placed in a drum of a massage system, said drum comprising carriers, and a liquid having a temperature higher than that of the frozen blocks of meat is supplied in the interior of the massage wings, and that brine having a temperature higher than that of the frozen blocks of meat is supplied to the drum. The drum rotates/revolves, and the blocks of meat are continuously broken up into smaller units of meat. Preferably, a negative pressure is established in the drum during thawing.

14 Claims, 3 Drawing Sheets

U.S. PATENT DOCUMENTS

| | | | |
|---|---|---|---|
| 6,105,490 A * | 8/2000 | Horn et al. | 99/472 |
| 7,524,520 B2 * | 4/2009 | Ludwig | 426/233 |
| 7,687,093 B2 * | 3/2010 | Nielsen | 426/524 |
| 2004/0166212 A1 * | 8/2004 | Liberman et al. | 426/281 |

FOREIGN PATENT DOCUMENTS

| | | |
|---|---|---|
| EP | 0 574 327 A | 12/1993 |
| FR | 2 711 485 A | 5/1995 |
| GB | 2 085 742 | 5/1982 |

* cited by examiner

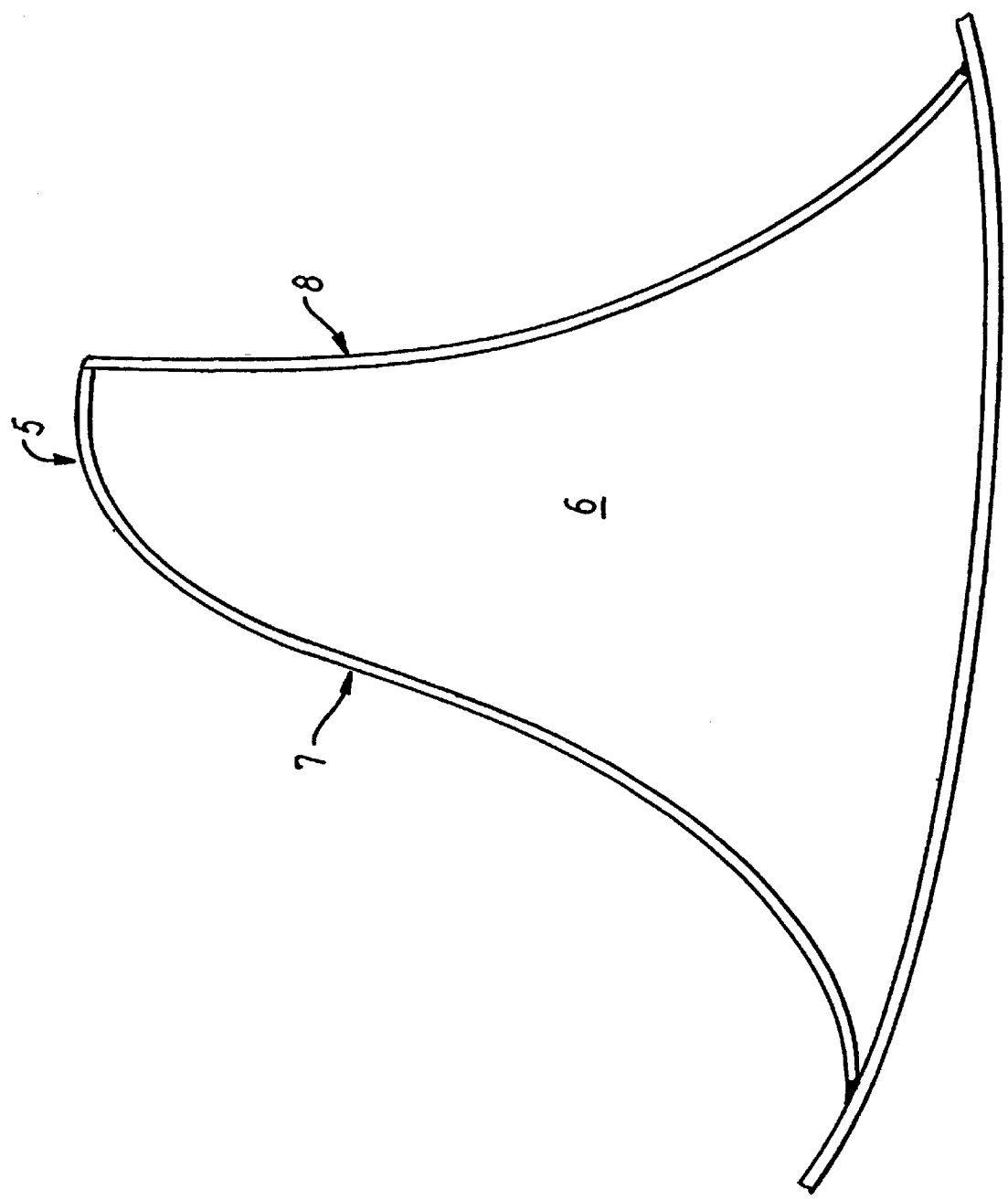

METHOD AND MEANS OF THAWING MEAT AND USE THEREOF

TECHNICAL FIELD

The invention relates to a method of thawing one or more frozen blocks of meat having a temperature $T_1$, said blocks of meat being composed of units of meat frozen together.

BACKGROUND

Thawing of meat is frequently a process stage which must be carried out before further process stages, such as preservation, addition of salts, drying, heat preparation, packing, etc., take place. Thawing is carried out e.g. by removing the meat from a freezer room and storing the meat in a room at a temperature above the freezing point of the meat at the prevailing atmospheric pressure for a period of time which is required in order for the meat to thaw and be ready for the next process stage.

In certain industrial processes, large amounts of meat are present in smaller units of meat, which are e.g. cut, cleaned or the like pieces of meat. Freeze storage of large amounts of meat causes the smaller pieces to freeze together to individual larger blocks of meat, unless special measures are taken, such as individual packing of the units of meat before freezing. Since this measure is a time- and resource-consuming intermediate stage, it is frequently left out, and the situation prior to the thawing of the meat is therefore that large amounts of meat have most frequently frozen together. It may be a time-consuming process to thaw the meat by simple storage of the meat at a temperature higher than the freezing point of the meat, since large blocks of meat consisting of numerous units of meat require a considerably longer period of thawing than each individual unit of meat. Typically, the block of meat will thaw inhomogenously, so that the units of meat near the surface have thawed after a while, while pieces of meat not close to the surface are still frozen.

SUMMARY OF THE INVENTION

The object of the invention is to provide a method of thawing a block of meat consisting of smaller units of meat with a considerably shorter period of thawing than if the block of meat was to thaw by simple storage at a temperature above the freezing point of the block of meat at the prevailing atmospheric pressure, and to provide a more homogeneous thawing of the meat units of the block of meat.

The object is also that during this thawing a supply of additives takes place, as brine with expedient substances, e.g. salts with phosphates or chlorides, is added.

This object is achieved by a method like the one stated in the opening paragraph, and wherein also the frozen blocks of meat are placed in a drum of a massage system, said drum comprising massage wings/carriers, wherein a supply of liquid at a temperature $T_2$ takes place in the interior of the massage wings, said temperature being higher than $T_1$, said supply generating a temperature $T_3$ on the surface of the massage wings/carriers, said temperature $T_3$ being higher than $T_1$, and wherein the brine having a temperature $T_4$ is supplied to the drum, said temperature $T_4$ being higher than $T_1$.

One or more frozen blocks of meat having the temperature $T_1$ are placed in the massage system, whereby they get into contact with the inner drum of the massage system. The carriers of the drum are kept at a constant temperature which is higher than $T_1$ and above the melting point of the liquid contained in the block of meat, which causes the blocks of meat to thaw. The liquid in the interior of the carriers preferably has a temperature $T_2$ in the range 10-40° C., which results in a surface temperature $T_3$ of the carriers which is preferably 1-2° C. lower than $T_2$. When simultaneously supplying a brine having a temperature $T_4$ lower than or equal to $T_2$ and approximately differing 1-2° C., the block of meat is caused to contact a heat reservoir of greater heat capacity than the one originating from the inner surface of the drum alone, which reduces the period of thawing. The drum rotates, thereby increasing the heat exchange between the block of meat, the units of meat, the brine and the interior of the drum, and resulting in a mechanical impact between the carriers and units of meat in the surface of the block of meat, which causes the units of meat to be loosened from each other, which increased heat exchange and mechanical impact also reduces the period of thawing. By providing a negative pressure in the drum it is ensured that the boiling point of the liquids in the drum is reduced and particularly that the vapour pressure increases, equivalent to an increase in the evaporation, which is likewise instrumental in reducing the period of thawing.

By using the method according to the invention, it is moreover ensured that the boiling point of water is reduced relative to the boiling point of water at atmospheric pressure, whereby the period of thawing is reduced additionally.

By using the method according to the invention, it is moreover ensured that the heat exchange effect between blocks of meat, brine and drum walls is increased additionally, and that the block of meat as a whole is affected mechanically, which is instrumental in separating the block of meat into its individual units of meat and results in a reduction in the period of thawing of the meat.

By using the method according to the invention, it is moreover ensured that the thawing temperatures are controlled, so that the meat is not damaged in the thawing, and expedient heat conduction takes place from the carriers to the brine and to the block of meat.

By using the method according to the invention, it is moreover ensured that the liquid used for heat exchange between the carriers and the meat is readily accessible and of a particularly simple composition.

By using the method according to the invention, it is moreover ensured that the boiling point of water is reduced relative to the boiling point of water at atmospheric pressure, whereby the period of thawing is reduced additionally.

By using the method according to the invention, it is moreover ensured that the units of meat and the block of meat are massaged in the massage system.

By using the method according to the invention, it is moreover ensured that there is an option between soft or hard massage of the units of meat and the block of meat.

The invention also relates to use of the method of thawing blocks of meat.

BRIEF DESCRIPTION OF THE DRAWINGS

The invention will now be explained more fully with reference to the drawing, in which FIG. 4 shows a detailed view of a massage wing seen in section.

DETAILED DESCRIPTION OF THE INVENTION

Figure 1:
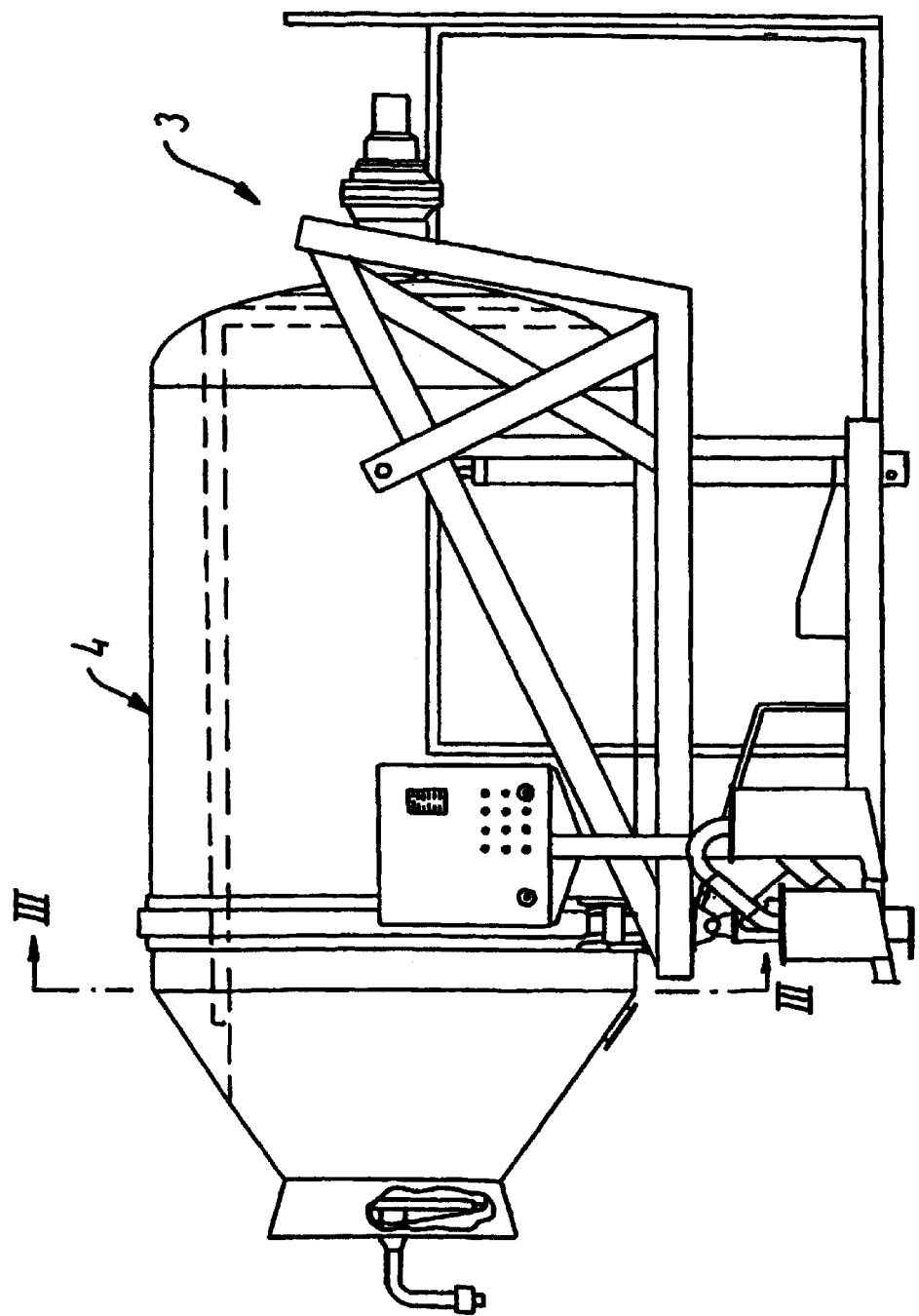
FIG. 1 shows a massage system seen from the side.
Figure 2:
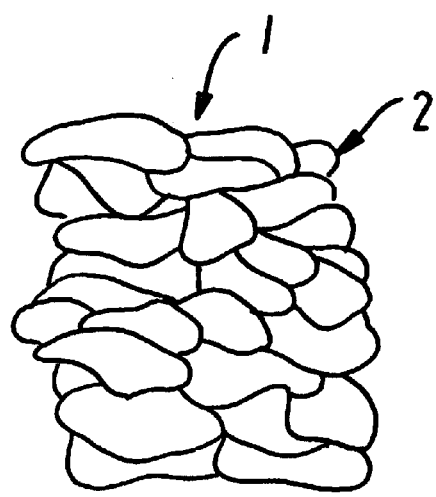
FIG. 2 shows a frozen block of meat.
Figure 3:
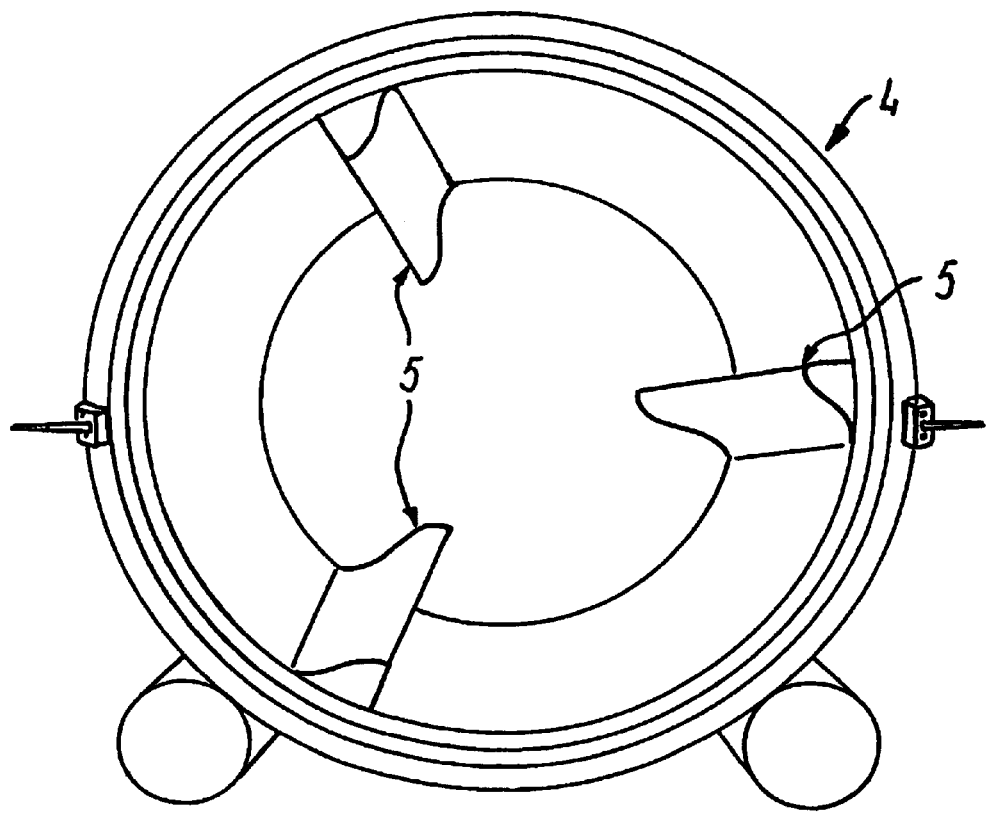
FIG. 3 shows an open massage drum seen from the end.

The massage system 3 and its drum 4 are seen in FIG. 1. One or more frozen blocks of meat 1 having a temperature $T_1$ are placed in the drum 4 of the massage system 3, and the drum 4 is closed and then appears as pressure-proof in the following processes. Each of the blocks of meat 1 consists of several units of meat 2, see FIG. 2, where a unit of meat 2 preferably has a weight below 1 kg, and a block of meat 1 may have a weight of more than 20 kg. A liquid 6 having a temperature $T_2$ is supplied to the interior of the carriers 5. The liquid 6 is preferably water, but may also be an oil product, and the supply takes place from and to a heat reservoir. The heat reservoir, the interior of the carriers 5 and the supply means, e.g. pipes, together constitute a closed system, which also comprises a device for recirculating the liquid 6, said liquid being preferably thermostat-controlled. $T_2$ is higher than $T_1$ and is preferably in the range 10-40° C. The supply of liquid 6 to the interior of the carriers 5 causes the surface of the carriers 5 to have a temperature $T_3$ which is typically equal to $T_2$ or 1-2° C. lower than $T_2$. $T_3$, like $T_2$, is higher than $T_1$.

A brine is supplied to the interior of the drum 4, consisting preferably of water with dissolved salts, e.g. containing phosphate ions, $PO_4^{3-}$ and/or chloride ions, $Cl^-$ having a temperature $T_4$ which is preferably 2-4° C. higher than $T_1$. The brine may be supplied under vacuum, which reduces the boiling point of water relative to the boiling point of water at the prevailing atmospheric pressure. The brine serves as an effective medium for transferring heat between the sides of the drum 4 and the block of meat 1. The added ions increase the ion activity in the liquid 6, which perhaps gives an additional heat conduction ability. The brine is also instrumental in the process of massaging the meat.

Rotation of the drum 4 with the contents of blocks of meat 1, units of meat 2 and brine causes heat exchange between the sides of the drum 4 and the brine, and from the sides of the drum 4 to blocks of meat 1 and units of meat 2 as well as between blocks of meat 1, units of meat 2 and the brine. After a while, the block of meat 1 begins to break up into its units of meat 2, since the block of meat 1 as a whole thaws, and since the rotation causes a mechanical impact between preferably the carriers 5 and the block of meat 1. New units of meat 2 will thus continuously form part of the surface of the block of meat 1, and since the surface has the greatest heat exchange effect with the walls of the drum and the brine, the units of meat are preferably loosened in the surface of the block. During this continuous thawing process the drum is preferably subjected to a negative pressure of typically 0.1-0.95 bar. The negative pressure causes the boiling point of water to be reduced relative to the situation at a prevailing atmospheric pressure, and reduces the period of thawing. The negative pressure, combined with the temperatures prevailing in the drum 4, also characterizes an environment in which isolated units of meat 2 in the drum do not begin to deteriorate, during the period of time between loosening from the block of meat until the thawing of remaining blocks of meat 1 has been completed.

The thawing process changes at a time from being thawing of a block of meat 1 consisting of units of meat 2 to being preferably thawing of the individual units of meat 2. The drum 4 continues its rotation during the thawing of the individual units of meat 2.

The carriers 5 may be constructed asymmetrically, see e.g. FIG. 4, where a first side 7 of the carrier 5 having a soft carrier surface has another profile than a second side 8 of the carrier 5 having a hard carrier face. The mechanical impact between the carriers 5 and the blocks of meat 1 and units of meat 2, if any, is different according to whether it is the first side 7 or the second side 8 of the carrier 5 which is preferably in contact with units of meat 2 or blocks of meat 1. In the example of the carrier 5 shown in FIG. 4 a rotation, which preferably causes the first side 7 to contact units of meat 2 or blocks of meat 1, will give rise to a softer massage than a rotation in the opposite direction. A change in the direction of rotation preferably takes place in connection with a targeted massage of the individual units of meat, but it is possible to change the rotation of the drum 4 at any time during the process.

The invention claimed is:

1. A method of thawing one or more frozen blocks of meat (1) having a temperature $T_1$, said blocks of meat (1) being composed of units of meat (2) frozen together, the method comprising:

placing the frozen blocks of meat (1) in a drum (4) of a massage system (3), said drum (4) having carriers (5), supplying a liquid (6) having a temperature $T_2$, in the interior of the carriers (5), said temperature being higher than $T_1$, said supply liquid (6) generating a temperature $T_3$, on a surface of the carriers (5), said temperature $T_3$ being higher than $T_1$, establishing a negative pressure in the drum (4), supplying brine having a temperature $T_4$, to an interior of the drum (4), said temperature $T_4$, being higher than $T_1$, rotating/revolving the drum, causing the blocks of meat (1) and the brine to get into physical contact with the heated carriers (5), so as to thaw the one or more frozen blocks of meat contained therein, and, reducing a boiling point of the brine to prevent overheating of the meat by providing the negative pressure within the drum during rotation thereof.

2. The method according to claim 1, characterized in that the brine is supplied to the drum (4) under the negative pressure established therein.

3. The method according to claim 1 further comprising supplying sufficient heat to the frozen blocks of meat (1) and to the brine to cause individual frozen blocks of meat (1) to be broken up into several and separate units of meat (2).

4. The method according to claim 1 wherein the difference between $T_1$, and $T_4$, is 2-4° C.

5. The method according to claim 1 wherein $T_2$, is in the range 10-40° C.

6. The method according to claim 1 wherein $T_4$, is lower than or equal to $T_2$.

7. The method according to claim 1 wherein $T_3$ is lower than or equal to $T_2$.

8. The method according to claim 1 wherein the liquid (6) supplied to the carriers (5) is water.

9. The method according to claim 1 wherein the drum (4) continues to rotate/revolve after the blocks of meat (1) have been broken up into units of meat (2).

10. The method according to claim 3 wherein the drum (4) continues to rotate/revolve after the blocks of meat (1) have been broken up into units of meat (2).

11. The method according to claim 1 wherein the carriers (5) are constructed asymmetrically, having a soft impact side and a hard impact side, and further comprising changing the direction of revolution of the drum during rotation, whereby the blocks of meat (1) and the units of meat (2) separated therefrom are caused to contact either the soft impact sides or the hard impact sides of the carriers (5).

12. The method according to claim 3 wherein the carriers (5) are constructed asymmetrically, having a soft impact side and a hard impact side with respect to a direction of rotation, and further comprising changing the direction of revolution of the drum during rotation, whereby the blocks of meat (1) and the units of meat (2) separated therefrom are caused to contact either the soft impact sides or the hard impact sides of the carriers (5).

13. The method of claim 6, wherein the temperature difference between $T_4$ and $T_2$ ranges from 1-2° C.

14. The method of claim 7, wherein the temperature difference between $T_2$ and $T_3$ ranges from 1-2° C.

* * * * *